United States Patent
Albertson et al.

(10) Patent No.: US 8,762,871 B2
(45) Date of Patent: Jun. 24, 2014

(54) DYNAMIC PREVIEW OF DIAGRAM ELEMENTS TO BE INSERTED INTO A DIAGRAM

(75) Inventors: Daniel Richard Albertson, Issaquah, WA (US); Barry Christopher Allyn, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 12/025,048

(22) Filed: Feb. 3, 2008

(65) Prior Publication Data
US 2009/0199123 A1    Aug. 6, 2009

(51) Int. Cl.
*G06F 3/048* (2013.01)

(52) U.S. Cl.
USPC .......................... 715/771; 715/772; 715/762

(58) Field of Classification Search
None
See application file for complete search history.

(56) References Cited

U.S. PATENT DOCUMENTS

| | | | | |
|---|---|---|---|---|
| 4,686,522 A | * | 8/1987 | Hernandez et al. | 345/160 |
| 4,723,211 A | * | 2/1988 | Barker et al. | 715/210 |
| 4,815,029 A | | 3/1989 | Barker et al. | |
| 5,555,357 A | | 9/1996 | Fernandes et al. | |
| 5,588,108 A | | 12/1996 | Kumar et al. | |
| 5,600,779 A | | 2/1997 | Palmer et al. | |
| 5,774,661 A | * | 6/1998 | Chatterjee et al. | 709/203 |
| 5,786,816 A | | 7/1998 | Macrae et al. | |
| 6,002,399 A | | 12/1999 | Haine et al. | |
| 6,029,172 A | * | 2/2000 | Jorna et al. | 1/1 |
| 6,154,756 A | * | 11/2000 | Hearn et al. | 715/236 |
| 6,239,813 B1 | | 5/2001 | Erskine | |
| 6,243,092 B1 | | 6/2001 | Okita et al. | |
| 6,246,411 B1 | | 6/2001 | Strauss | |
| 6,289,513 B1 | * | 9/2001 | Bentwich | 717/106 |
| 6,384,851 B1 | * | 5/2002 | Takasu et al. | 715/866 |
| 6,393,425 B1 | | 5/2002 | Kelly | |
| 6,628,285 B1 | | 9/2003 | Abeyta et al. | |
| 6,697,087 B1 | | 2/2004 | Kelly | |
| 6,715,127 B1 | * | 3/2004 | Eschbach et al. | 715/202 |
| 6,725,428 B1 | * | 4/2004 | Pareschi et al. | 715/205 |
| 6,751,780 B1 | * | 6/2004 | Neff et al. | 715/247 |
| 6,851,089 B1 | * | 2/2005 | Erickson et al. | 715/255 |
| 6,931,288 B1 | | 8/2005 | Lee et al. | |

(Continued)

FOREIGN PATENT DOCUMENTS

| | | |
|---|---|---|
| EP | 0947911 | 10/1999 |
| JP | 7-282003 | 10/1995 |
| WO | WO 2004/063862 | 7/2004 |

OTHER PUBLICATIONS

Landy et al., Borland JBuilder Developer's Guide, Published Dec. 18, 2002, excerpts from chap. 2, Safari Books Online, pp. 7-11.*

(Continued)

*Primary Examiner* — William Titcomb
(74) *Attorney, Agent, or Firm* — Steve Crocker; Jim Ross; Micky Minhas

(57) ABSTRACT

Technologies are described herein for providing a dynamic preview of diagram elements to be inserted into a flowchart or other diagram. Through the use of the embodiments presented herein, a diagramming application program displays a preview of diagram elements to be inserted into a diagram by an element insertion control on a drawing canvas when a cursor is placed over the element insertion control for threshold period of time. The preview is displayed until the mouse cursor is moved away from the element insertion control or the element insertion control is selected.

10 Claims, 12 Drawing Sheets

(56) References Cited

U.S. PATENT DOCUMENTS

| | | | |
|---|---|---|---|
| 7,047,502 B2* | 5/2006 | Petropoulos et al. | 715/781 |
| 7,093,192 B2 | 8/2006 | Mullen et al. | |
| 7,117,449 B1 | 10/2006 | Levin et al. | |
| 7,137,077 B2 | 11/2006 | Iwema et al. | |
| 7,503,012 B2* | 3/2009 | Chen et al. | 715/769 |
| 7,685,527 B2* | 3/2010 | Yan et al. | 715/762 |
| 7,698,635 B2* | 4/2010 | Grigoriadis et al. | 715/243 |
| 7,721,200 B2* | 5/2010 | Grigoriadis et al. | 715/243 |
| 7,721,201 B2* | 5/2010 | Grigoriadis et al. | 715/243 |
| 2003/0076364 A1* | 4/2003 | Martinez et al. | 345/810 |
| 2003/0158832 A1* | 8/2003 | Sijacic et al. | 707/1 |
| 2004/0119763 A1 | 6/2004 | Mizobuchi et al. | |
| 2004/0261029 A1 | 12/2004 | Skjaervik | |
| 2005/0028094 A1 | 2/2005 | Allyn | |
| 2005/0108620 A1 | 5/2005 | Allyn et al. | |
| 2005/0149882 A1 | 7/2005 | Iwema et al. | |
| 2005/0254859 A1* | 11/2005 | Kim et al. | 399/182 |
| 2006/0036964 A1 | 2/2006 | Satterfield et al. | |
| 2006/0259872 A1 | 11/2006 | Mullen et al. | |
| 2007/0036403 A1 | 2/2007 | Albertson et al. | |
| 2007/0101321 A1 | 5/2007 | Mahoney et al. | |
| 2007/0118793 A1* | 5/2007 | Arora et al. | 715/501.1 |
| 2008/0109472 A1* | 5/2008 | Underwood et al. | 707/102 |
| 2008/0147634 A1* | 6/2008 | Diaz et al. | 707/5 |
| 2008/0148164 A1* | 6/2008 | Read | 715/763 |
| 2008/0148188 A1* | 6/2008 | Read | 715/841 |
| 2008/0148192 A1* | 6/2008 | Read et al. | 715/854 |
| 2008/0270932 A1* | 10/2008 | Diaz et al. | 715/780 |
| 2008/0313565 A1 | 12/2008 | Albertson | |
| 2010/0122192 A1* | 5/2010 | Hanna | 715/765 |

OTHER PUBLICATIONS

Biofore, Visio 2007 Bible, John Wiley and Sons, Pub. Apr. 2, 2007, chapter 4, sections 1,2, and 8, entire chapter 5, "Connecting Shapes".*
"The Fastest Way to Make Great Looking Flow Charts", pp. 5.
Tooke, "Creating Effective UML Diagrams has never been Easier", pp. 5.
"Create Flowcharts and Block Diagrams using Microsoft Office Visio 2007", Microsoft Office Visio, 2007, Microsoft Corporation, pp. 6.
"Edge Diagrammer 5.08.1831", 1997-2007, Super Shareware, pp. 3.
"RFFlow Professional Flowcharting", pp. 3.
International Search Report dated Nov. 27, 2008 in International Application No. PCT/US08/065462.
Rekimoto, "Multiple Computer User Interfaces: 'Beyond the Desktop'," 2000, Sony Computer Science Laboratories Inc., 2 pages.
Rekimoto, "Pick-and-Drop: A Direct Manipulation Technique for Multiple Computer Environments," Sony Computer Laboratories Inc, 8 pages.
U.S. Official Action dated Apr. 2, 2010 in U.S. Appl. No. 11/763,656.
U.S. Official Action dated Sep. 15, 2010 in U.S. Appl. No. 11/763,656.
Chinese Official Action dated Jun. 15, 2011 in Chinese Application No. 200880020260.8.
U.S. Official Action dated Jun. 13, 2011 in U.S. Appl. No. 11/763,656.
"The Fastest Way to Make Great Looking Flow Charts", downloaded Jan. 2, 2008 from http://www.breezetree.com/flowcharting-software/Pages 5.
Tooke, "Creating Effective UML Diagrams has never been Easier", Oct. 11, 2005 downloaded from http://www.ibm.com/developerworks/rational/library/05/1011_tooke/, pp. 5.
"Edge Diagrammer 5.08.1831", downloaded Jan. 2, 2008 from http://www.supershareware.com/info/edge-diagrammer.html Super Shareware, pp. 3.
"RFFlow Professional Flowcharting" downloaded Jan. 2, 2008 from http://www.sharewareconnection.com/rfflow-professional-flowcharting.htm pp. 3.
U.S. Official Action dated Dec. 21, 2012 in U.S. Appl. No. 11/763,656.
Japanese Official Action dated Apr. 27, 2012 in Japanese Application No. 2010-512261.
European Search Report dated Sep. 5, 2013 in European Application No. 08756580.0.
U.S. Notice of Allowance dated Jan. 16, 2014 in U.S. Appl. No. 11/763,656.

* cited by examiner

DYNAMIC PREVIEW OF DIAGRAM ELEMENTS TO BE INSERTED INTO A DIAGRAM

BACKGROUND

Many diagramming applications allow for the creation of a flowchart to illustrate a business process. Specific shapes are often used in the flowchart to identify various types of steps within the process. For example, a rectangle may identify an action step in the process, while a diamond represents a decision step in the process. To create a flowchart using a diagramming application, a user may add shapes to a flowchart through the use of shape insertion controls that exist on the drawing canvas. For example, in MICROSOFT OFFICE VISIO from MICROSOFT CORPORATION of Redmond, Wash., when a mouse cursor is hovered over an existing shape in a flowchart diagram, connection controls are displayed on the drawing canvas in proximity to the shape. If one of the connection controls is then selected, a new diagram shape of the default shape type is placed in the flowchart at the location indicated by the utilized connection control and a connector is inserted to connect the new shape to the existing shape. Similarly, if two adjacent shapes exist in the flowchart diagram, and the connection control of one shape indicating the direction of the adjacent shape is selected, a connector is inserted into the flowchart to connect the adjacent shapes.

Another method for adding shapes to a diagram involves the use of a mini-toolbar. When a mouse cursor is moved close to a connection control, a mini-toolbar may be displayed near the cursor on the drawing canvas, allowing the user to select from the various shape types available in the mini-toolbar. When the user selects one of the shape types, a diagram shape of that type is placed in the flowchart at the location indicated by the connection control and a connector is inserted connecting the new shape to the existing shape.

However, in these scenarios a user cannot be sure of what actual changes will be made to the flowchart diagram by selecting a connection control or shape type from the mini-toolbar until the operation is complete. If the outcome is not as expected, the user must use the undo functionality of the diagramming application to remove the inserted shape and/or connector and attempt the desired operation again, perhaps using another method. Because diagramming is often a rapid process, having to perform an operation multiple times may cause a decrease in efficiency.

It is with respect to these considerations and others that the disclosure made herein is provided.

SUMMARY

Technologies are described herein for providing a dynamic preview of diagram elements to be inserted into a flowchart or other diagram. Through the utilization of the concepts presented herein, a diagramming application, or other type of application program, displays a preview of the diagram elements to be inserted into the diagram when a user moves the mouse cursor over an element insertion control on the drawing canvas. The preview may be displayed until the user moves the mouse cursor away from the element insertion control or the element insertion control is selected.

According to one aspect presented herein, a diagramming application detects that a cursor is in proximity to an element insertion control on the drawing canvas for a threshold period of time. The element insertion control may be a connection control associated with an active shape on the drawing canvas. In response to detecting that the cursor in proximity to the element insertion control for the threshold period of time, the diagramming application determines what shapes and/or connectors would be inserted into the diagram if the element insertion control was selected. For instance, selecting a connection control may cause a diagram shape to be inserted into the diagram and connected to the active shape, or it may cause a connector to be inserted into the diagram between the active shape and an adjacent shape.

Once the shapes and/or connectors to be inserted into the diagram are determined, the diagramming application displays a preview of the shapes and/or connectors on the drawing canvas. The preview shows precisely what the diagram will look like if the element insertion control is selected. According to aspects presented herein, the diagramming application may display the shapes and/or connectors with attributes different from those of other elements on the drawing canvas, to indicate they represent a preview of the pending operation. The diagram application displays the preview of the shapes and/or connectors until the element insertion control is selected, or until the diagram application detects that the cursor is no longer in proximity to the element insertion control.

According to further aspects, a user interface (UI) is displayed on the drawing canvas in addition to the preview of the shapes and/or connectors to be inserted. The UI includes selectable controls corresponding to multiple types of diagram elements available for insertion into the diagram. In one aspect, the UI may consist of a number of selectable shape controls corresponding to the multiple diagram shapes available for placement in the diagram. If the diagramming application detects that the cursor is in proximity to one of the selectable controls, the diagramming application re-displays the preview of the shapes and/or connectors on the drawing canvas, with the shapes being of the type corresponding to the selectable control.

It should be appreciated that although the implementations described herein are presented in the context of a diagramming application, any type of program that creates or displays visual representations of a process may utilize the concepts presented herein. The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that is further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
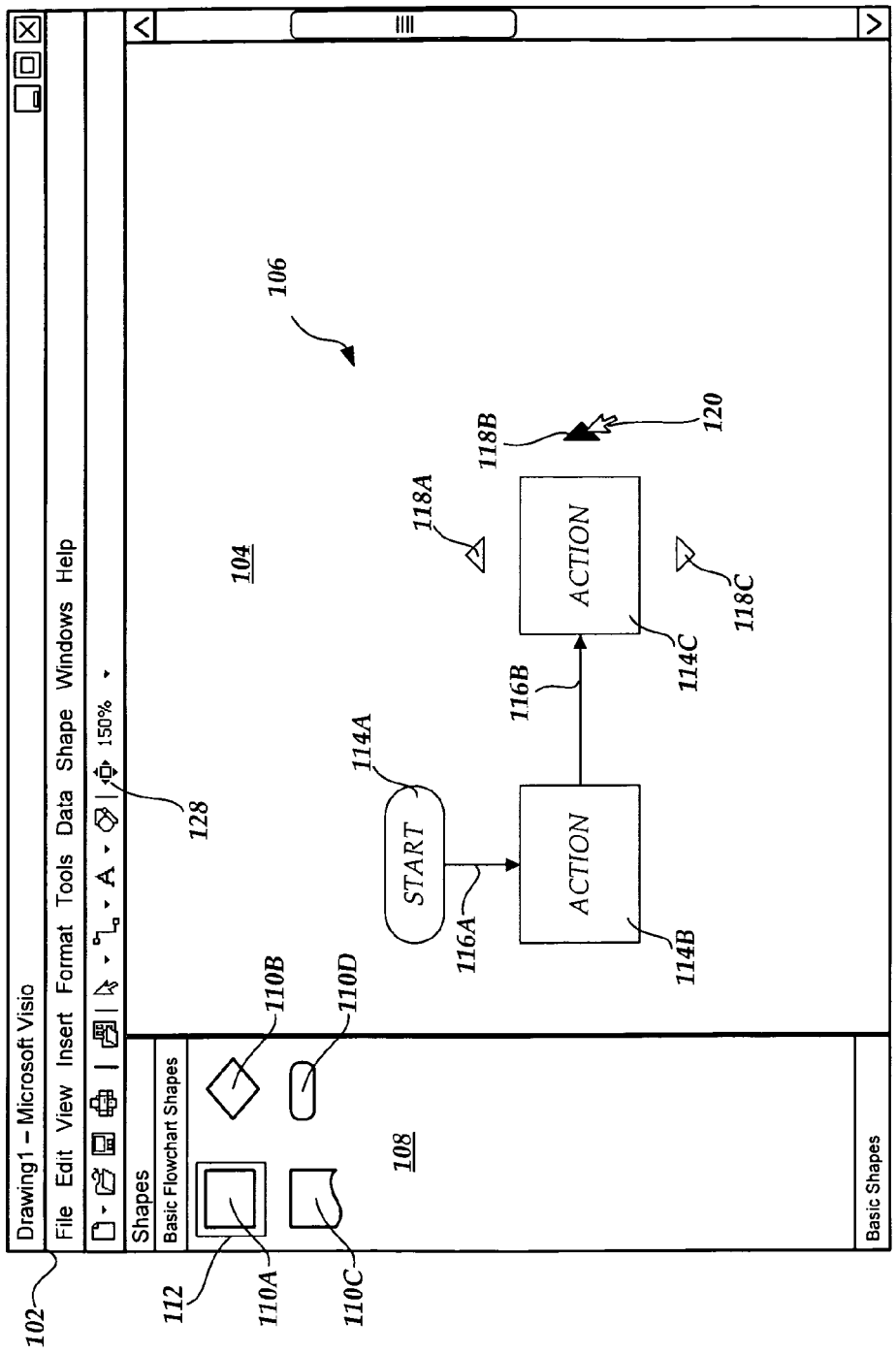
FIGS. 1A-1C are screen diagrams showing one implementation provided herein for providing a preview of a shape and connector to be inserted into a diagram.

The following detailed description is directed to technologies for providing a preview of diagram elements to be inserted into a diagram. Through the use of the embodiments presented herein, a diagramming application, or other type of application program, displays a preview of the diagram elements to be inserted into the diagram when a user moves the mouse cursor over an element insertion control on the drawing canvas. This allows the user to preview the diagram elements that will be inserted and their positions before selecting the element insertion control. In this way, the user can avoid performing an operation with an unexpected outcome, and being forced to utilize the undo functionality of the diagramming application to remove the unwanted diagram elements.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Aspects of the various implementations will first be described with respect to FIGS. 1A-3C, which show sample screen diagrams from a diagramming application. While the diagramming application described herein is the MICROSOFT OFFICE VISIO diagramming application, it should be appreciated that the disclosure is equally applicable to all diagramming applications capable of creating and displaying a diagram. It should also be understood that although the disclosure provided herein is described in the context of creating and editing a flowchart, the disclosure is equally applicable to creating or editing any other type of diagram, such as a network diagram.

Referring now to the drawings, in which like numerals represent like elements through the several figures, aspects of a computing system and methodology for providing a preview of diagram elements to be inserted into a diagram will be described. In particular, FIG. 1A shows an illustrative sample diagram 106, created using a diagramming application. The diagram 106 was created on a drawing canvas 104 in a window 102 of the diagramming application. The diagram 106 symbolizes a process consisting of multiple operations represented by diagram elements, including shapes 114A-114C and connectors 116A-116B. As discussed briefly above, specific shapes are often used in a flowchart to identify the various types of operations within the process. For example, a rectangle may identify an action operation in the process, while a diamond represents a decision operation in the process. The flow of the process between the operations is further represented by the connectors 116A and 116B in the diagram 106.

The window 102 includes a number of controls located adjacent to the drawing canvas 104. A shape gallery 108 is one control area that may be located adjacent to the drawing canvas 104. The shape gallery 108 provides shape controls 110A-110D corresponding to different diagram shapes that are most commonly used when creating a diagram. It should be appreciated that any number and type of diagram shapes may be included within the shape gallery 108. The shape gallery 108 allows for the placement of diagram shapes 114 on the drawing canvas 104 through a method such as the drag-and-drop method described above. In addition, the shape gallery 108 allows the user to select one of the shape controls 110A-110D to identify a default shape type 112, which will be used by controls on the drawing canvas for shape insertion operations, as will be described in detail below.

To facilitate the rapid insertion of diagram elements into the diagram 106, a diagramming application may provide element insertion controls on the drawing canvas. These controls allow for the insertion of diagram elements into the diagram 106 without requiring the user to move the cursor 120 from the drawing canvas 104 to the shape gallery 108. For example, the MICROSOFT OFFICE VISIO diagramming application provides an auto-connect control 128. When the auto-connect control 128 is selected, the diagramming application displays connection controls 118A-118C on the drawing canvas when the user moves the cursor 120 in a position proximate to, or hovers over, any of the diagram shapes 114A-114C on the drawing canvas. It should be appreciated that the term "proximate" as used throughout this disclosure in describing the movement of the cursor 120 with respect to any other diagram element or control includes movement of the cursor 120 in close proximity to the diagram element or control, as well as movement of the cursor 120 that equates to hovering over the diagram element or control. In addition to the connection controls illustrated, the element insertion control may include any control that, when activated, causes one or more diagram elements to be placed on the drawing canvas.

The connection controls 118A-118C identify the available placement locations for the next diagram elements to be inserted into the diagram 106. It should be appreciated that any number of connection controls may be located around any diagram element corresponding to any number of placement locations. Selecting one of the connection controls 118A-118C results in one or more diagram elements being added to the diagram 106 in the location indicated by the connection control 118A-118C. According to implementations provided herein, when the user navigates the cursor 120 over a connection control 118 corresponding to the desired location for the insertion of the next diagram elements into the diagram 106, the diagramming application will display a preview of the diagram elements to be inserted into the diagram 106 on the drawing canvas 104. This allows the user to assess whether the diagram element insertion operation will result in the desired outcome before selecting the connection control 118.

Figure 1B:
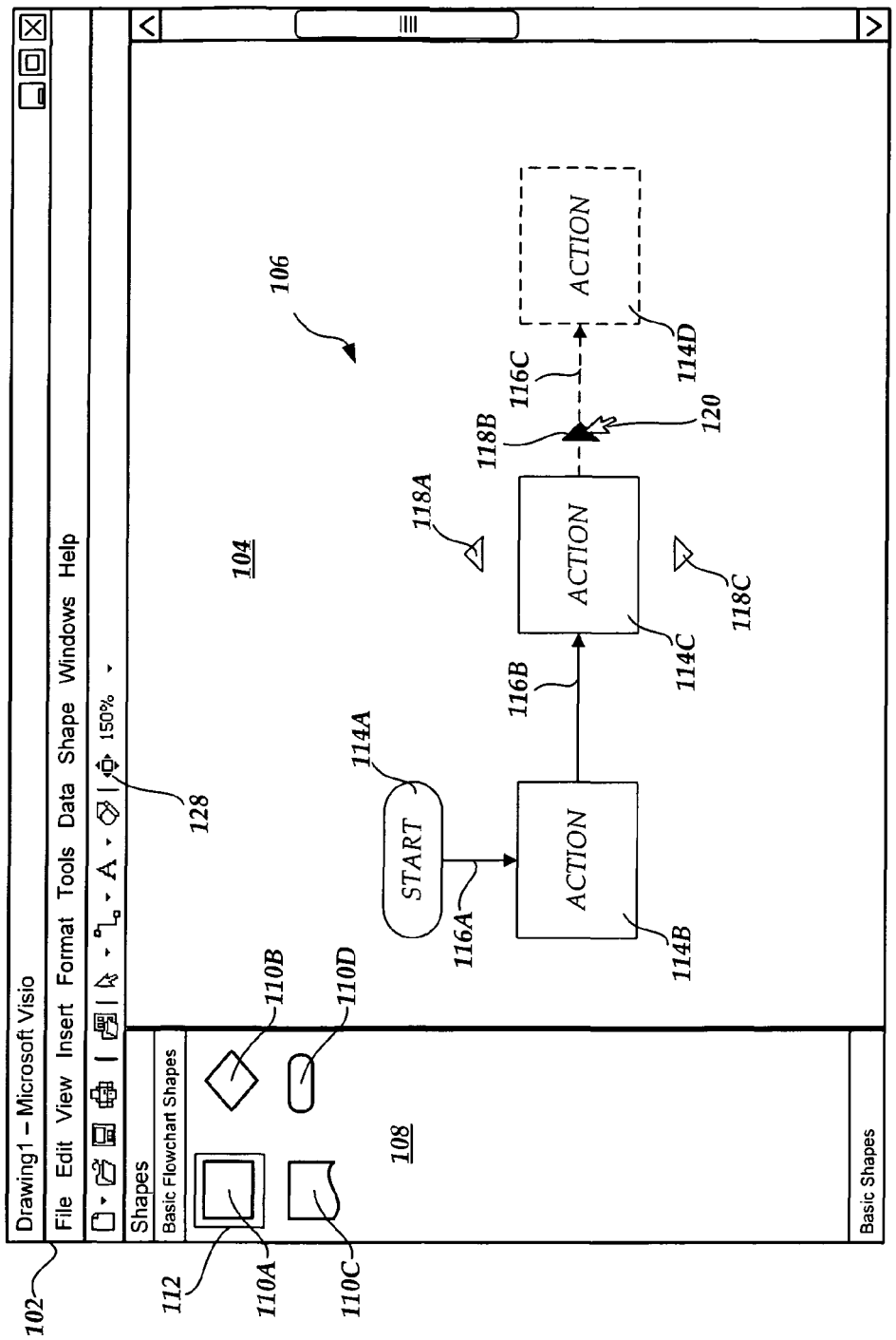

For example, as illustrated in FIG. 1A, the user places the cursor 120 over a connection control 118B. The connection control 118B in this example is operative to insert diagram elements into the diagram 106 to the right of the active shape 114C if selected by the user. The diagram elements to be inserted include a new shape of the default shape type 112, here a rectangle shape 110A, and a connector between the new shape and the active shape 114C. If the cursor 120 remains over the connection control 118B for a threshold period of time, described in detail below in regard to FIGS. 4A and 4B, the diagramming application displays a preview of the rectangle shape 114D and the connector 116C on the drawing canvas 104, as shown in FIG. 1B.

The diagramming application displays the previewed shape 114D and connector 116C on the drawing canvas 104 in the location corresponding to where they would be inserted into the diagram 106 if the user was to select the connection control 118B. In one embodiment, the diagramming application displays the previewed shape 114D and connector 116C with dashed lines, as shown in FIG. 1B, to differentiate the previewed diagram elements from the other shapes 114A-114C and connectors 116A-116B on the drawing canvas 104. As can be appreciated by one skilled in the art, a variety of techniques to differentiate the previewed diagram elements can be utilized, including displaying the previewed elements in a different color, with a different line weight, with a different level of transparency, or using animated lines.

Figure 1C:
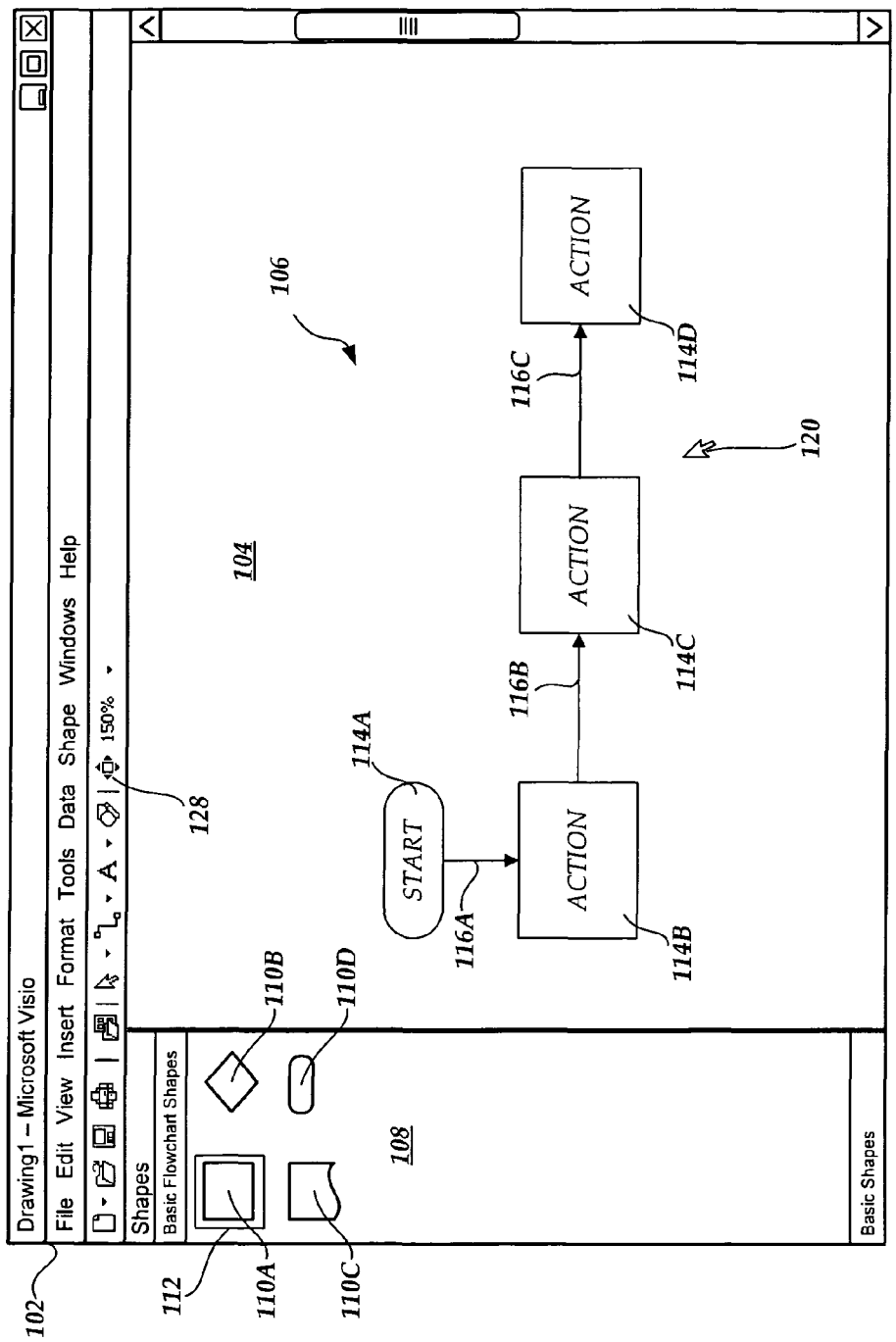

As shown in FIG. 1C, if the user selects the connection control 118B, the diagramming application removes the preview display from the drawing canvas 104 and performs the element insertion operation, resulting in the rectangle shape 114D and connector 116C being inserted into the diagram 106. In an alternative scenario not shown, if the user navigates the cursor 120 away from the connection control 118B without selecting it, the diagramming application simply removes the preview display from the drawing canvas without performing the element insertion operation. For example, the user may navigate the cursor over another connection control 118A, which would result in the diagramming application displaying a preview of the diagram elements to be inserted into the diagram 106 as a result of the user selecting that connector control 118A.

Figure 2A:
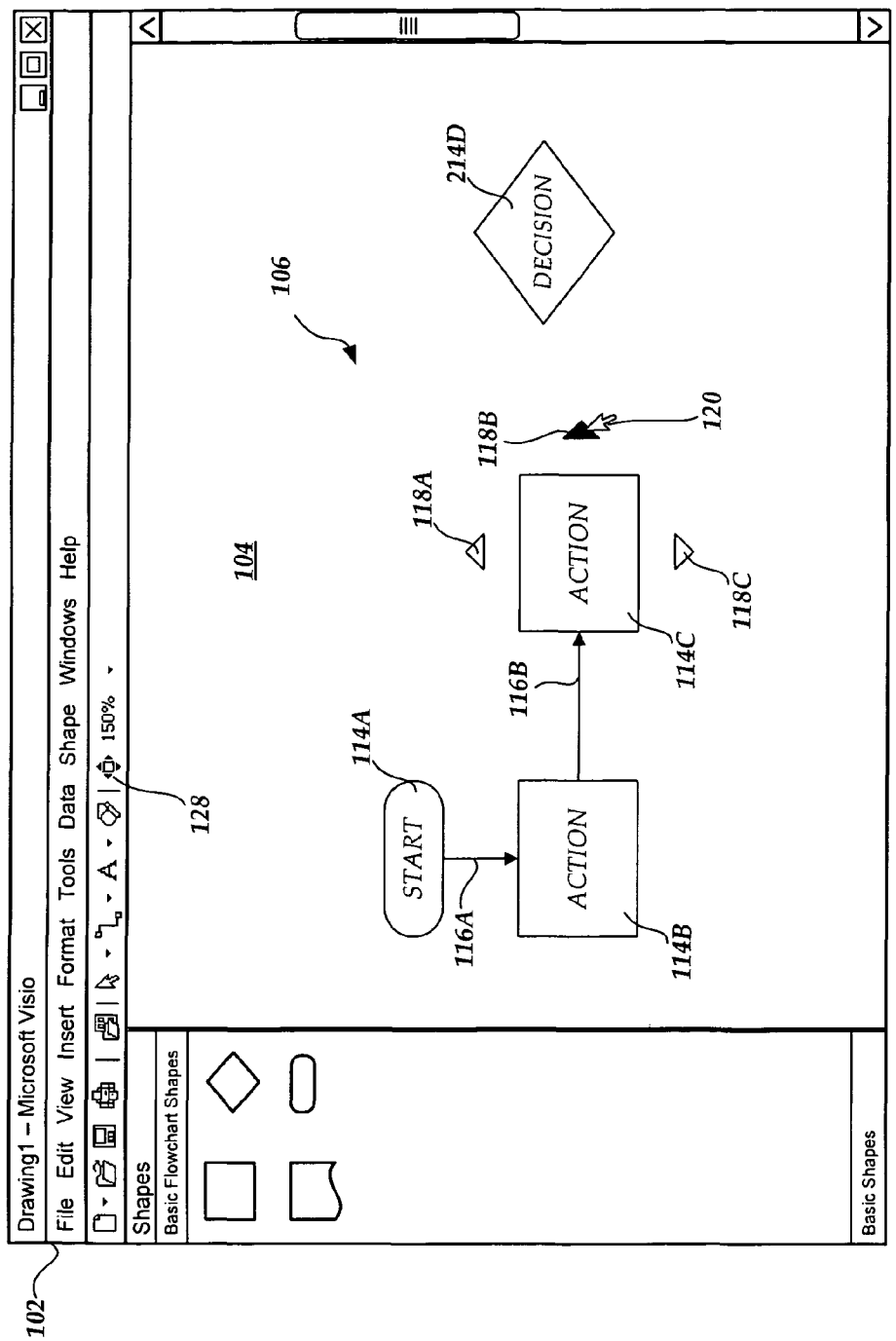
FIGS. 2A-2C are screen diagrams showing a further embodiment provided herein for providing a preview of a connector to be inserted between existing shapes in a diagram.
Figure 2B:
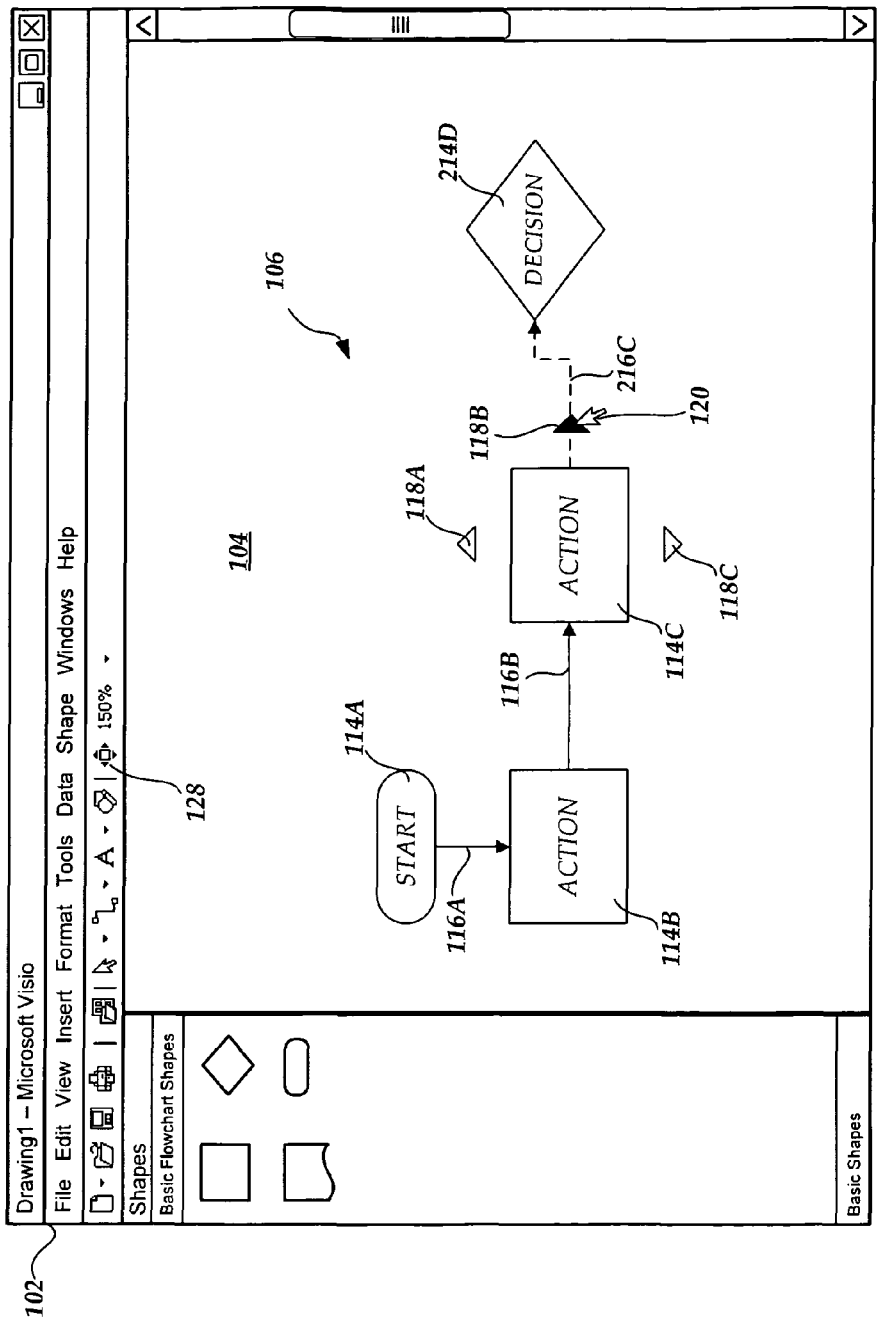
Figure 2C:
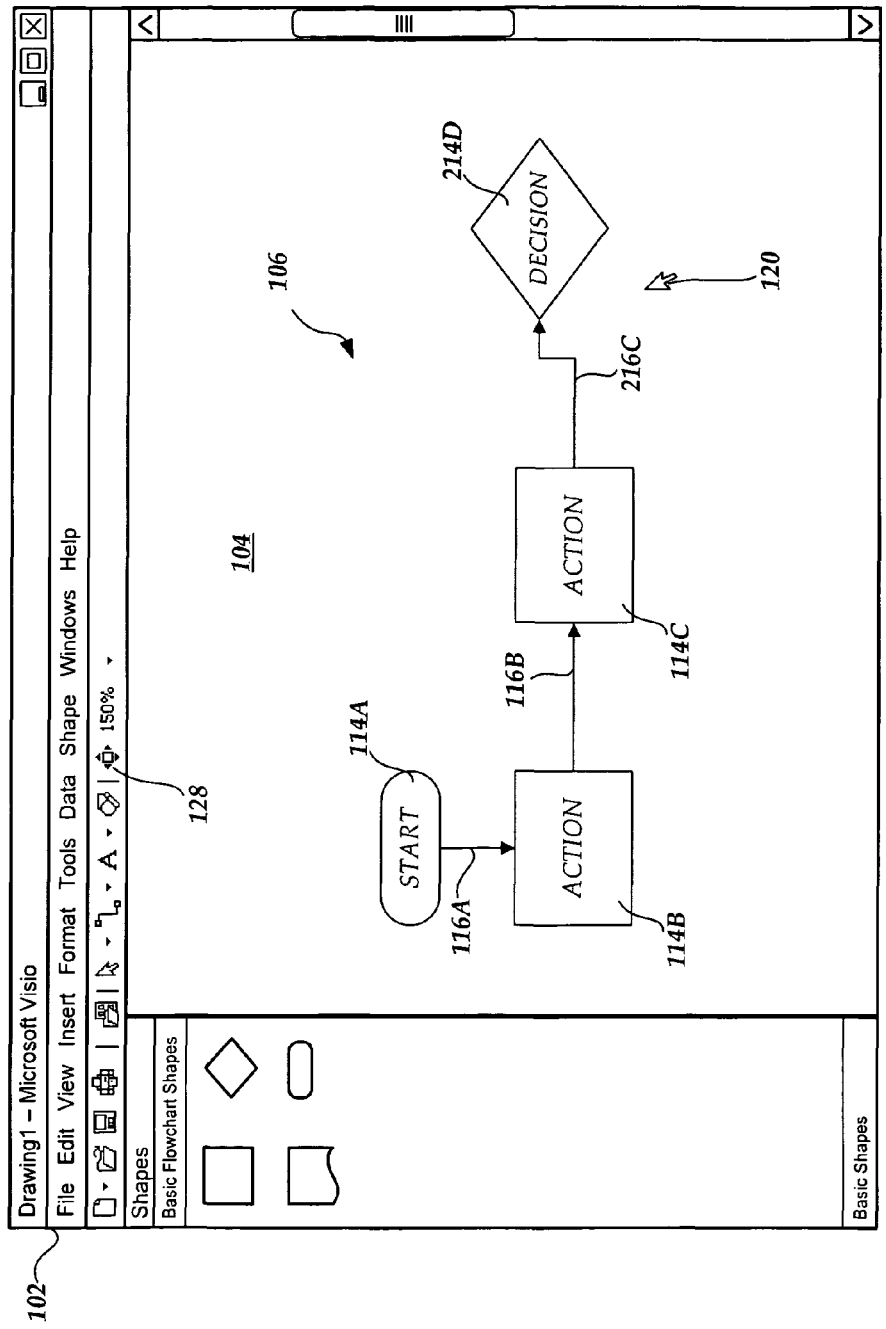

By way of further example, FIG. 2A shows the diagram 106 including an existing but unconnected shape 214D adjacent to the active shape 114C. The user places the cursor 120 over the connection control 118B indicating the direction of the adjacent shape 114C. The connection control 118B in this example is operative to insert a new connector into the diagram 106 between the active shape 114C and the adjacent shape 214D. If the cursor 120 remains over the connection control 118B for the threshold period, the diagramming application displays a preview of the new connector 216C on the drawing canvas 104, as shown in FIG. 2B. As described above, if the user selects the connection control 118B, the diagramming application removes the preview display from the drawing canvas 104 and performs the element insertion operation, resulting in the connector 216C being inserted into the diagram 106, as shown in FIG. 2C.

Figure 3A:
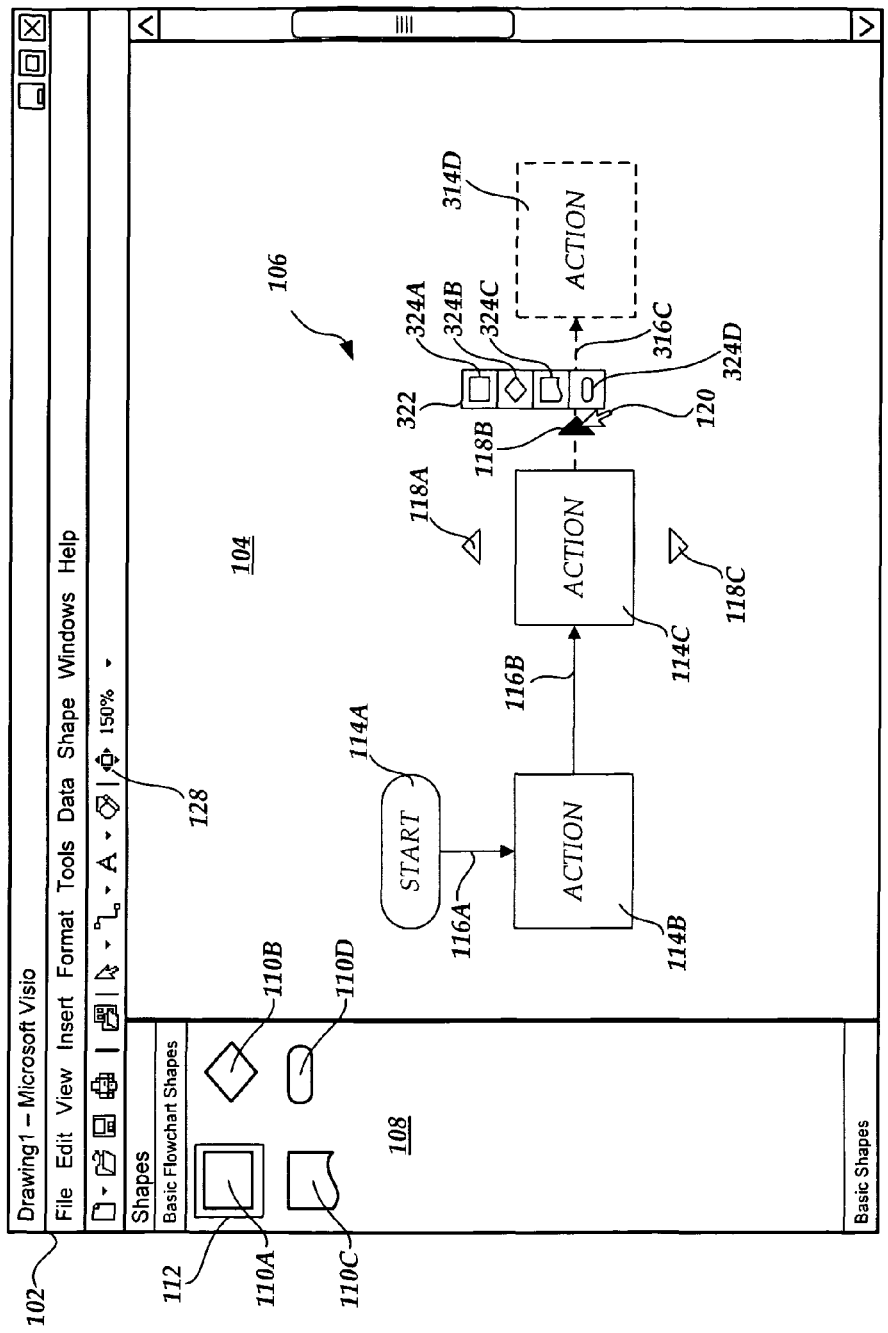
FIGS. 3A-3C are screen diagrams showing a further embodiment provided herein for providing a preview of a shape and connector to be inserted into a diagram utilizing a shape selection UI.

In a further embodiment shown in FIG. 3A, when the user places the cursor 120 over the connection control 118B, the drawing application displays a diagram element type selection user interface (UI) 322 on the drawing canvas 104 in addition to the preview of the diagram elements to be inserted into the diagram 106. The previewed diagram elements in this example include a new shape 314D of the rectangle type based upon the currently selected default shape type 112, and a new connector 316C between the new shape 314D and the active shape 114C. The diagram element type selection UI 322 as shown in this example consists of four shape selection controls 324A-324D corresponding to the four gallery shape controls 110A-110D located in the shape gallery 108. If the user navigates the cursor 120 over one of the shape selection controls 324 of the diagram element type selection UI 322, the diagramming application will update the type of the previewed shape 314D to match the shape type corresponding to the shape selection control 324.

Figure 3B:
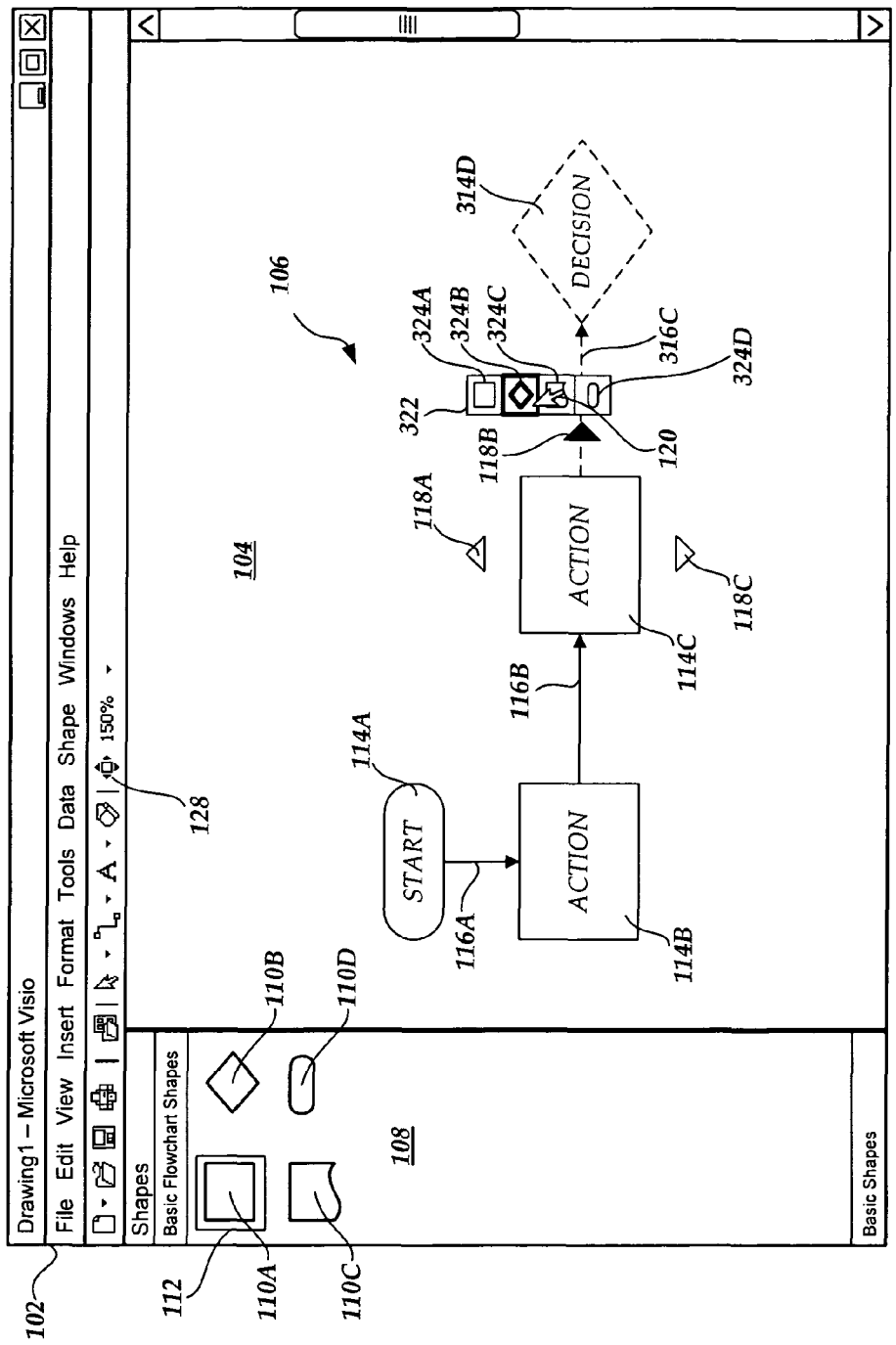
Figure 3C:
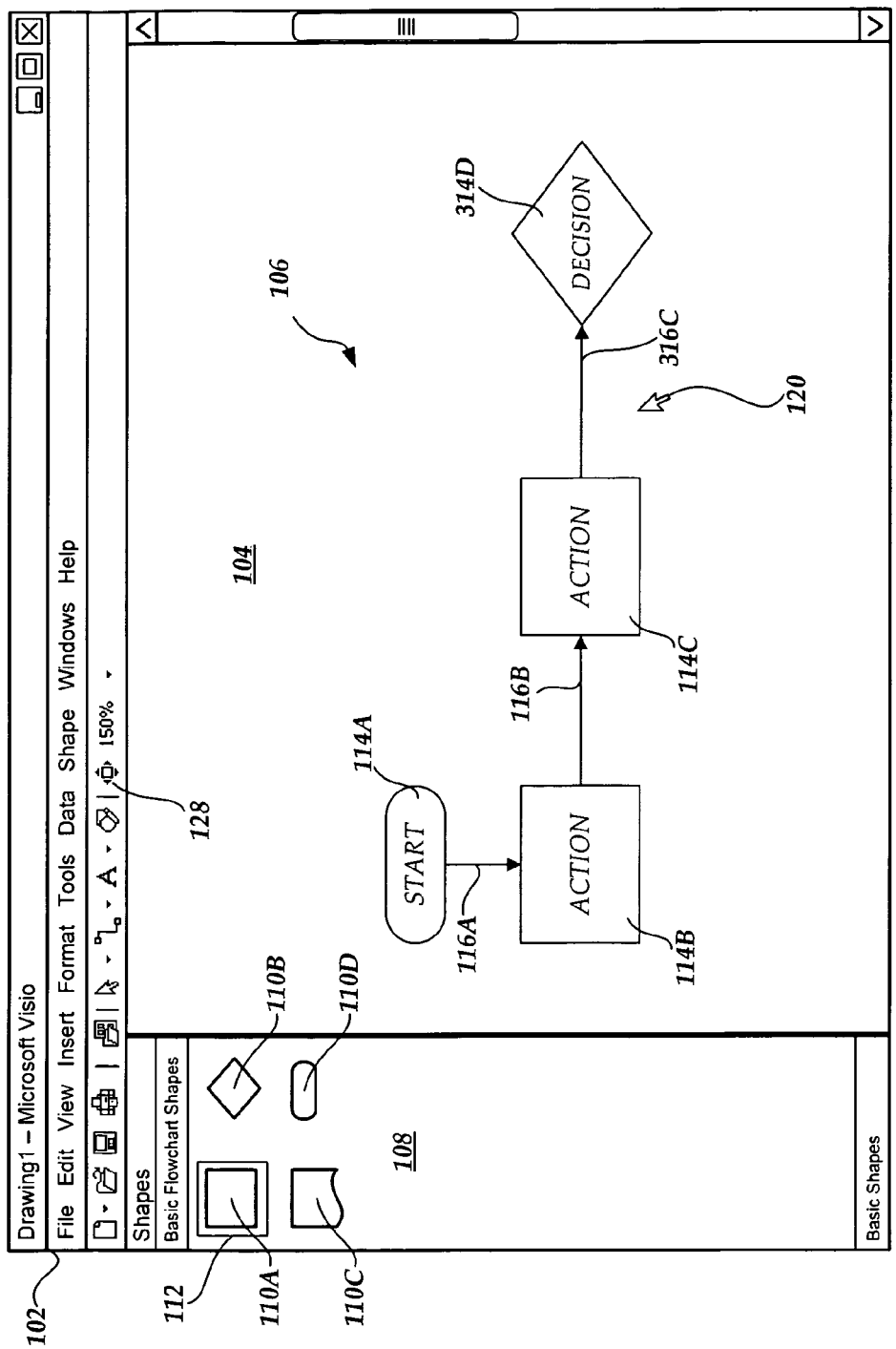

For example, as shown in FIG. 3B, the user positions the cursor over the shape selection control 324B corresponding to the triangle shape type. In response, the diagramming application changes the type of the previewed shape 314D to the triangle type, and updates the display of the previewed connector 316C appropriately. If the user subsequently hovers the cursor 120 over another shape selection control 324 of the diagram element type selection UI 322, the diagram application will update the previewed shape 314D and connector 316C accordingly. If the user selects the shape selection control 324B, the diagramming application removes the preview display from the drawing canvas 104 and performs the element insertion operation, resulting in the new shape 314D and connector 316C being inserted into the diagram 106, as shown in FIG. 3C.

Figure 4A:
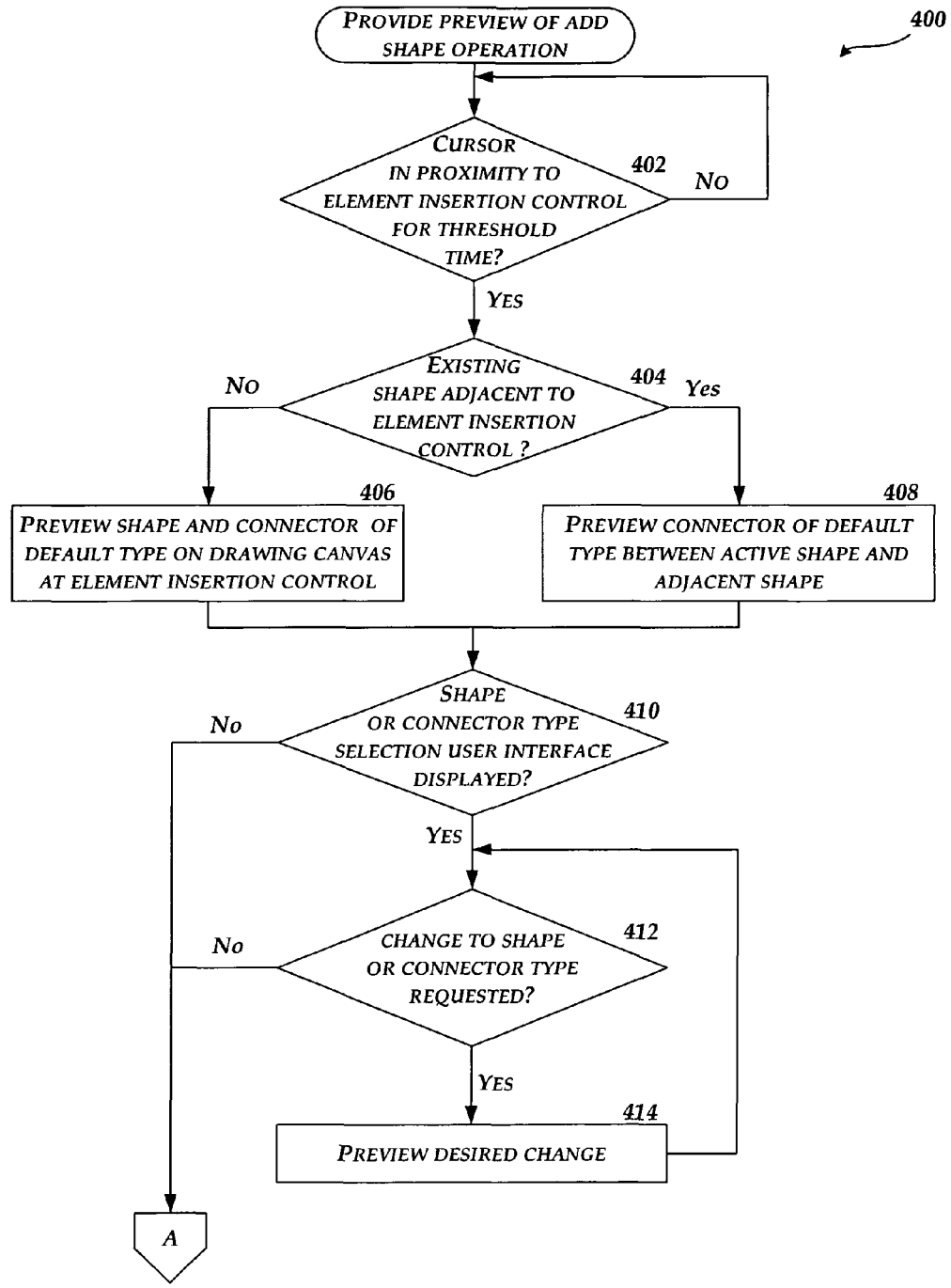
FIGS. 4A-4B are flow diagrams showing an illustrative process provided in one implementation described herein for providing a preview of diagram elements to be inserted into a diagram.
Figure 4B:
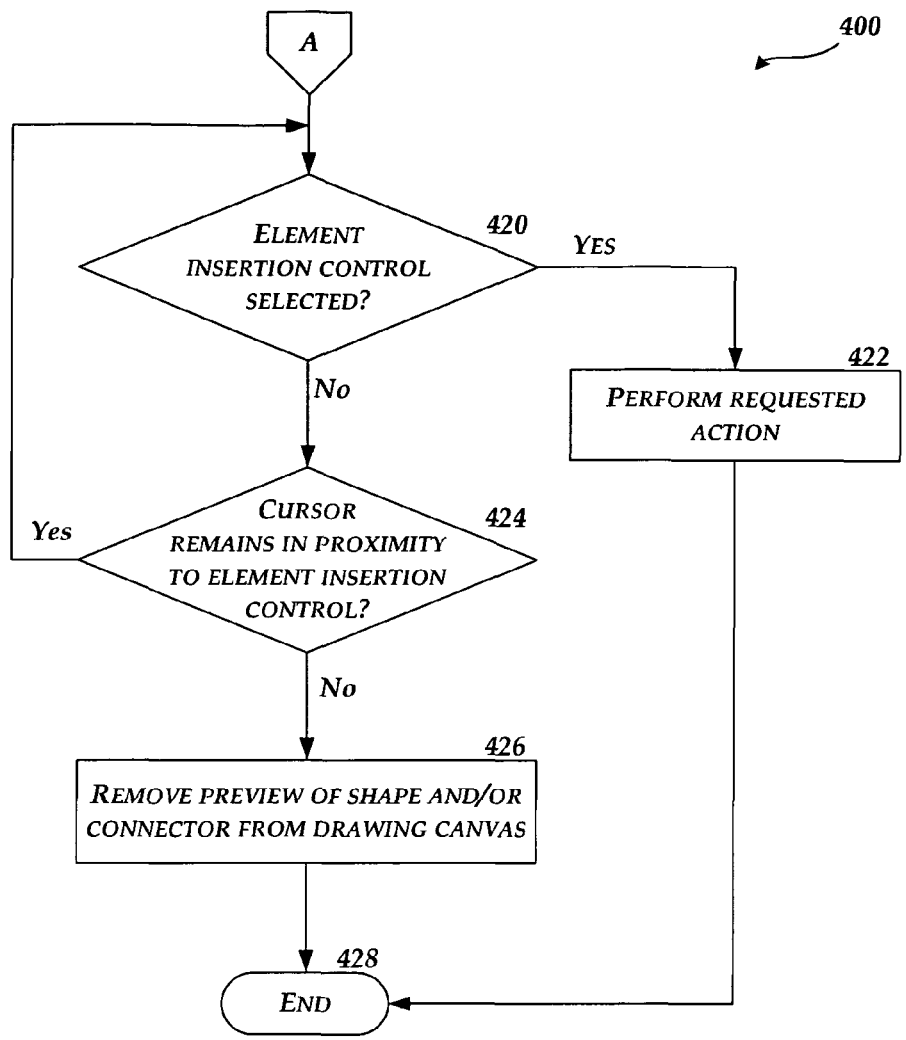

Turning now to FIGS. 4A-4B, an illustrative routine 400 will be described for providing a preview of diagram elements to be inserted into a diagram 106. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the diagramming application detects whether the cursor 120 is in proximity to or hovering over an element insertion control on the drawing canvas 104 for a threshold period of time. In one embodiment, the threshold period of time is a sufficient amount of time to eliminate the flashing of preview displays as the cursor 120 is navigated across the diagram 106, such as 200ms. In alternative embodiments, the threshold time may be zero, resulting in the immediate display of the preview. If the diagramming application detects the cursor 120 is in proximity to an element insertion control, the routine 400 moves to operation 404, where the diagramming application determines whether there is an existing shape adjacent to the element insertion control. By doing so, the diagramming application can determine what diagram elements will be inserted into the diagram 106 if the element insertion control is selected.

For example, in one embodiment the element insertion control may be a connector control 118 associated with an active shape 114C in the diagram 106. To determine what diagram elements will be inserted into the diagram by the connector control 118, the diagramming application determines if any shapes exist on the drawing canvas 104 adjacent to the active shape 114C in the direction indicated by the connection control 118. This determination may be made by detecting if another shape in the diagram 106 is currently positioned on the drawing canvas 104 within a threshold proximity of the active shape 114C in the region indicated by the connection control 118.

In operation 404, if no adjacent shape is found on the diagram 106, the routine 400 proceeds to operation 406, where the diagramming application displays a preview of a new shape 114D and connector 116C on the drawing canvas 104 as described in detail above in regard to FIG. 1B. In one embodiment, the diagramming application displays the preview of the new shape 114D and connector 116C using the same rules and routines as the diagramming application would use to perform the element insertion operation if the connector control 118 was selected. This ensures that the previewed diagram elements are of same type and in the same position as the elements that would be inserted by the pending operation. If an adjacent shape 214D is found on the diagram 106, the routine 400 proceeds from operation 404 to operation 408, where the diagramming application displays a preview of a connector 216C on the drawing canvas 104 connecting the adjacent shape 214D to the active shape 114C, as described in detail above in regard to FIG. 2B.

The routine 400 then proceeds to operation 410, where the diagramming application determines if a diagram element type selection UI 322 is displayed on the drawing canvas. If a diagram element type selection UI 322 is displayed, the routine 400 proceeds to operation 412, where the diagramming application detects that a changed to the type of the previewed diagram elements is required. For example, as described in detail above in regard to FIG. 3B, the user may position the cursor 120 over a shape selection control 324B on the diagram element type selection UI 322 indicating that the previewed shape should be changed to the triangle shape type. If this required change is detected, the routine proceeds to operation 414, where the diagramming application changes the type of the previewed shape 314D to the triangle type, and updates the display of the previewed connector 316C appropriately. From operation 414, the routine 400 returns to operation 412, where the diagramming application detects whether any further changes to the type of the previewed diagram elements is required.

If no changes to the type of the diagram elements is detected at operation 412, or if no diagram element type selection UI 322 is displayed at operation 410, the routine 400 proceeds to operation 420, where the diagramming application determines if the element insertion control is selected. If the element insertion control is selected, the routine 400 proceeds to operation 422 where the diagramming application removes the previewed diagram elements from the drawing canvas 104 and performs the requested operation. For example, as described in detail above in regard to FIG. 1C, if a connection control 118B is selected by the user, the diagramming application inserts the shape 114D and connector 116C into the diagram 106.

At operation 420, if the element insertion control is not selected by the user, the routine 400 moves to operation 424, where the diagramming application determines if the cursor 120 remains in proximity to or hovering over the element insertion control. If the cursor 120 remains in proximity to the element insertion control, the diagramming application continues to display the preview of the diagram elements, and the routine 400 returns to operation 420. If the cursor 120 is moved away from the element insertion control, the routine 400 proceeds to operation 426 where the diagramming application removes the previewed diagram elements from the drawing canvas 104. While embodiments described above characterize an element insertion control as a connector control 118, it will be appreciated by one of ordinary skill in the art that the operations described herein may be applied equally to any control displayed by the diagramming application on the drawing canvas 104 that is operative to insert diagram elements into the diagram 106.

Figure 5:
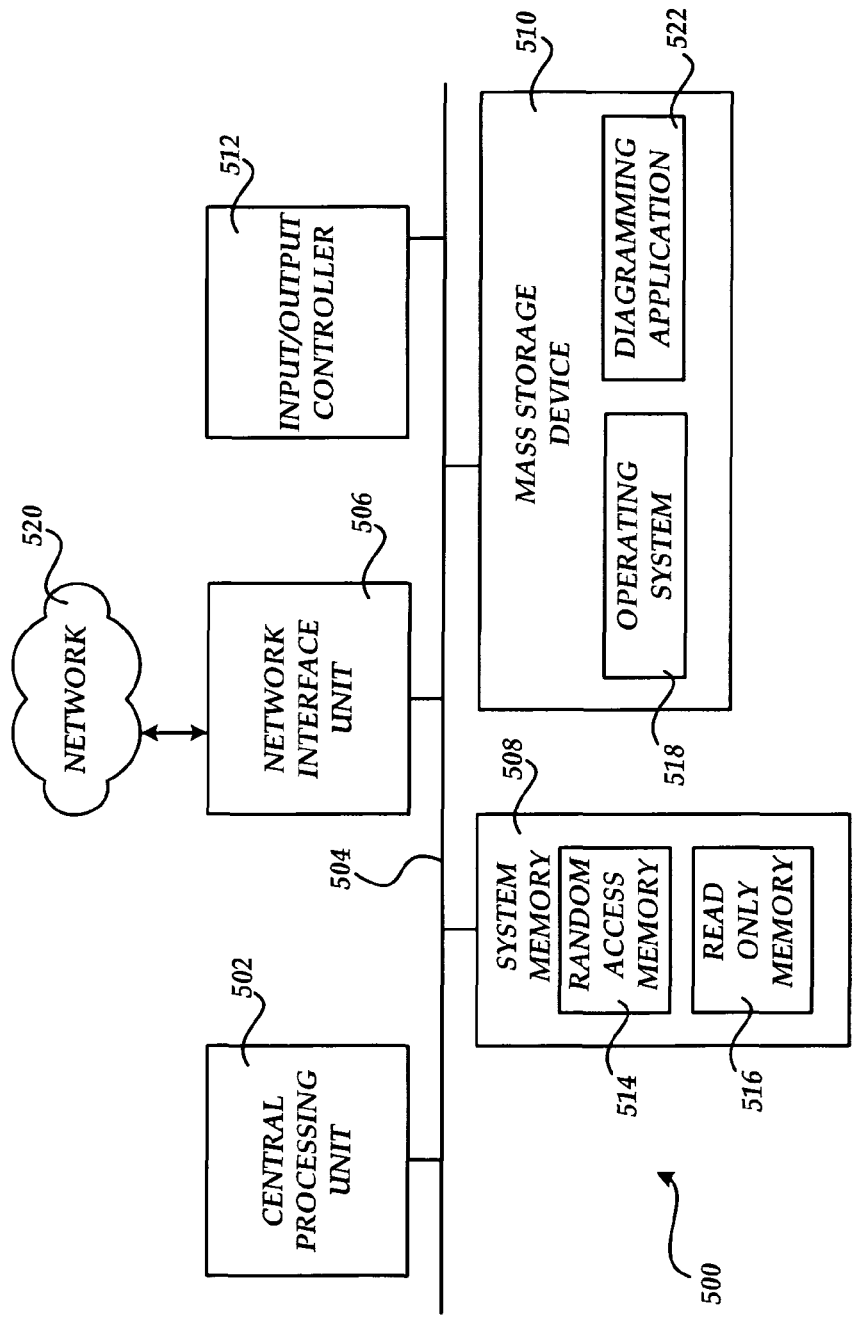
FIG. 5 is a computer architecture diagram showing an illustrative computer hardware and software architecture for a computing system capable of implementing the embodiments presented herein.

FIG. 5 shows an illustrative computer architecture for a computer 500 capable of executing the software components described herein for providing a preview of diagram elements to be inserted into a diagram 106. The computer architecture shown in FIG. 5 illustrates a conventional desktop, laptop computer, or server computer and may be utilized to embody any aspects of the computer program described herein.

The computer architecture shown in FIG. 5 includes a central processing unit 502 (CPU), a system memory 508, including a random access memory 514 (RAM) and a read-only memory (ROM) 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). It should be appreciated that the user input operations described herein as being performed with a mouse may be performed with a keyboard, electronic stylus, or other suitable user input device. Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules. In particular, the mass storage device 510 and the RAM 514 may store the diagramming application 522.

Based on the foregoing, it should be appreciated that technologies for providing a dynamic preview of diagram elements to be inserted into a flowchart or other diagram are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing a preview of a diagram element to be added to a diagram, the method comprising executing operations in a computing system for:
   presenting an element insertion control associated with an active shape on a drawing canvas in response to detecting that a cursor is positioned proximate to the active shape for a threshold time;
   detecting that the cursor is proximate to the element insertion control on the drawing canvas in response to detecting that the cursor is positioned over the element insertion control for a threshold time;
   upon detecting that the cursor is proximate to the element insertion control, determining a diagram element to be inserted into the diagram upon selection of the element insertion control by
      determining whether a shape exists in the diagram adjacent to an active shape associated with the element insertion control;
      upon determining that a shape exists in the diagram adjacent to the active shape, determining that a connector is to be inserted between the active shape and the adjacent shape; and
      upon determining that an adjacent shape does not exist, determining that a new shape is to be inserted adjacent to the active shape and a connector is to be inserted between the active shape and the new shape;
   upon determining the diagram element to be inserted, displaying a preview of the diagram element on the drawing canvas, the preview comprising a diagram element of a same type and in a same position on the drawing canvas as would be inserted upon selection of the element insertion control, wherein displaying a preview of the diagram element on the drawing canvas comprises displaying the diagram element with attributes differing from any other diagram elements of the same type on the drawing canvas;
   detect that the cursor is no longer proximate to the element insertion control; and
   upon detecting that the cursor is no longer proximate to the element insertion control, removing the preview of the diagram element.

2. The method of claim 1, wherein the element insertion control comprises a connection control operative to insert a new shape adjacent to an active shape associated with the connection control and to insert a connector between the new shape and the active shape.

3. The method of claim 1, wherein the element insertion control comprises a connection control operative to insert a connector between an active shape associated with the connection control and an existing shape adjacent to the active shape in the diagram.

4. The method of claim 1, wherein the new shape to be inserted is of a type determined by a default shape type.

5. The method of claim 4, further comprising executing operations in a computing system for:
   detecting a change from the default shape type to a revised default shape type; and
   upon detecting a change to the revised default shape type, removing the preview from the drawing canvas and displaying a preview of the new shape of the revised default shape type.

6. A computer storage medium, comprising computer-executable instructions that, when executed by a computer, cause the computer to:
   present an element insertion control associated with an active shape on a drawing canvas in response to detecting that a cursor is positioned proximate to the active shape for a threshold time;
   detect that the cursor is proximate to the connection control for a threshold time, the connection control associated with an active shape on a drawing canvas;
   upon detecting that the cursor is proximate to the connection control for the threshold time, determine whether a shape exists on the drawing canvas adjacent to the active shape in a direction indicated by the connection control by
      determining whether a shape exists in the diagram adjacent to the active shape associated with the element insertion control,
      upon determining that a shape exists in the diagram adjacent to the active shape, determining that a connector is to be inserted between the active shape and the adjacent shape; and
      upon determining that an adjacent shape does not exist, determining that a new shape is to be inserted adjacent to the active shape and a connector is to be inserted between the active shape and the new shape;
   upon determining that an adjacent shape exists, display a preview of a connector between the active shape and the adjacent shape on the drawing canvas, the preview of the connector comprising the connector in a same position on the drawing canvas as would be inserted upon selection of the connection control, wherein causing the computer to display a preview of a connector between the active shape and the adjacent shape on the drawing canvas comprises causing the computer to display the connector with attributes differing from any other connectors on the drawing canvas;
   upon determining that an adjacent shape does not exist, display a preview of a new shape adjacent to the active shape in the direction indicated by the connection control and a new connector between the new shape and the active shape on the drawing canvas, the preview of the new shape comprising the new shape of a same type and in a same position on the drawing canvas as would be inserted upon selection of the connection control, wherein causing the computer to display a preview of a new shape adjacent to the active shape in the direction indicated by the connection control and a new connector between the new shape and the active shape on the drawing canvas comprises causing the computer to display the new shape and the new connector with attributes differing from any other shapes and connectors on the drawing canvas;

detect that the cursor is no longer proximate to the connection control; and upon detecting that the cursor is no longer proximate to the connection control, remove the preview.

7. The computer storage medium of claim 6, further comprising computer-executable instructions that, when executed by a computer, cause the computer to:

detect that the connection control is selected;

upon detecting that the connection control is selected, remove the preview; and perform an insertion operation associated with the connection control.

8. The computer storage medium of claim 6, wherein the previewed new shape is of a type determined by a default shape type, and further comprising computer-executable instructions which, when executed by a computer, cause the computer to:

display a dynamic user interface on the drawing canvas, the user interface operative to allow a change to the default shape type;

detect a change from the default shape type to a revised default shape type; and upon detecting a change to the revised default shape type, remove the previewed new shape from the drawing canvas and display a preview of the new shape of the revised default shape type.

9. An apparatus comprising a processor and a computer storage medium having computer-executable instructions stored thereupon that, when executed by the processor, cause the processor to:

present an element insertion control associated with an active shape on a drawing canvas in response to detecting that a cursor is positioned proximate to the active shape for a threshold time;

detect that the cursor is proximate to the element insertion control on a drawing canvas by detecting that the cursor is positioned over the element insertion control for a threshold time;

upon detecting that the cursor is proximate to the element insertion control, determine a diagram element to be inserted onto the drawing canvas upon selection of the element insertion control by determining whether a shape exists in the diagram adjacent to an active shape associated with the element insertion control;

upon determining that a shape exists in the diagram adjacent to the active shape, determining that a connector is to be inserted between the active shape and the adjacent shape; and upon determining that an adjacent shape does not exist, determining that a new shape is to be inserted adjacent to the active shape and a connector is to be inserted between the active shape and the new shape;

upon determining the diagram element to be inserted, display a first preview of the diagram element on the drawing canvas, the first preview comprising a diagram element of a default type and in a same position on the drawing canvas as would be inserted upon selection of the element insertion control, wherein display a first preview of the diagram element on the drawing canvas comprises causing the computer to display the diagram element with attributes differing from any other diagram elements of the default type on the drawing canvas;

display a diagram element type selection user interface on the drawing canvas comprising a plurality of selection controls, each of the plurality of selections controls corresponding to one of a plurality of diagram element types;

detect that the cursor is proximate to one of the plurality of selection controls;

upon detecting that the cursor is proximate to the one of the plurality of selection controls, remove the first preview from the drawing canvas and display a second preview of the diagram element on the drawing canvas, the second preview comprising a diagram element of a type corresponding to the selection control and in a same position on the drawing canvas as would be inserted upon selection of the element insertion control, wherein display a second preview of the diagram element on the drawing canvas comprises causing the computer to display the diagram element with attributes differing from any other diagram elements of the type corresponding to the selection control on the drawing canvas;

detect that the cursor is no longer proximate to the element insertion control and the diagram element type selection user interface; and upon detecting that the cursor is no longer proximate to the element insertion control and the diagram element type selection user interface, remove the second preview of the diagram element.

10. The apparatus of claim 9, wherein the element insertion control comprises a connection control associated with an active shape, the connection control operative to:

insert a new shape adjacent to the active shape and a connector between the new shape and the active shape; and insert a connector between the active shape and an existing shape adjacent to the active shape in the diagram.

* * * * *